United States Patent
Suga et al.

[11] Patent Number: 5,857,702
[45] Date of Patent: Jan. 12, 1999

[54] IMPACT ENERGY ABSORBING MEMBER SUITABLE FOR A VEHICLE DOOR

[75] Inventors: Hitoshi Suga, Nagoya; Youji Noda, Hashima-gun; Tohru Yabe, Ichihara, all of Japan

[73] Assignees: Toyota Jidosha Kabushiki Kaisha, Toyota; Yazaki Industrial Chemical Co., Ltd., Shizuoka; Sumitomo Chemical Co., Ltd., Osaka, all of Japan

[21] Appl. No.: 790,363

[22] Filed: Jan. 28, 1997

[30] Foreign Application Priority Data

Jan. 31, 1996 [JP] Japan ................................ 8-015924

[51] Int. Cl.$^6$ .................................................. B60R 21/04
[52] U.S. Cl. ...................... 280/751; 296/189; 296/146.7; 188/377
[58] Field of Search ..................................... 280/751, 748, 280/752; 296/189, 146.7, 146.6, 146.5; 188/377, 371

[56] References Cited

U.S. PATENT DOCUMENTS

| | | | |
|---|---|---|---|
| 3,926,463 | 12/1975 | Landwehr et al. | 296/189 |
| 4,029,350 | 6/1977 | Goupy et al. | 188/377 |
| 4,050,726 | 9/1977 | Hablitzel | 188/371 |
| 4,272,103 | 6/1981 | Schmid et al. | 280/751 |
| 4,786,100 | 11/1988 | Kleemann et al. | 296/146.6 |
| 5,306,066 | 4/1994 | Saathoff | 296/146.6 |
| 5,356,177 | 10/1994 | Weller | 280/751 |
| 5,433,478 | 7/1995 | Naruse | 280/751 |
| 5,636,866 | 6/1997 | Suzuki et al. | 280/748 |

FOREIGN PATENT DOCUMENTS

| | | |
|---|---|---|
| 0 244 579 | 11/1987 | European Pat. Off. . |
| 3-013251 | 2/1991 | Japan . |
| 3-049110 | 5/1991 | Japan . |
| 3-049111 | 5/1991 | Japan . |
| 4-128912 | 11/1992 | Japan . |
| 5-000410 | 1/1993 | Japan . |
| 6-072153 | 3/1994 | Japan . |
| 6-247199 | 9/1994 | Japan . |
| 6-078035 | 11/1994 | Japan . |
| 7-052735 | 2/1995 | Japan . |
| 7-013533 | 3/1995 | Japan . |
| 7-031432 | 6/1995 | Japan . |
| 7-228144 | 8/1995 | Japan . |
| 7-232556 | 9/1995 | Japan . |
| 2 271 534 | 4/1994 | United Kingdom . |
| WO 95/25646 | 9/1995 | WIPO . |

*Primary Examiner*—Peter C. English
*Attorney, Agent, or Firm*—Pillsbury Madison & Sutro LLP

[57] ABSTRACT

An impact energy absorbing member is provided within a vehicle door, and due to impact load from an exterior, the impact energy absorbing member plastically deforms so as to absorb impact energy. The impact energy absorbing member includes a plurality of ribs whose respective surface directions are provided substantially along an impact load direction. Ends of the plurality of ribs are fixed to predetermined positions within the vehicle door. Reduced cross-sectional area portions are provided at fixed end sides of the plurality of ribs. The reduced cross-sectional area portions are provided such that cross-sectional areas of the plurality of ribs along a direction orthogonal to the impact load direction become smaller toward the fixed end sides of the plurality of ribs from lengthwise intermediate portions of the plurality of ribs whose lengths run along the impact load direction.

10 Claims, 10 Drawing Sheets

IMPACT ENERGY ABSORBING MEMBER SUITABLE FOR A VEHICLE DOOR

BACKGROUND OF THE INVENTION

1. Field of the Invention

The present invention relates to an impact energy absorbing member which is provided at the interior portion of an automobile door and absorbs impact energy at the time of a side collision. In particular, the present invention relates to an impact energy absorbing member in which, when the impact energy absorbing member receives an impact load, resin ribs plastically deform so as to absorb the impact energy.

2. Description of the Related Art

A structure has conventionally been known in which an energy absorbing member is provided in the side door of a vehicle such as an automobile for times when the side door receives an impact load from the vehicle transverse direction due to a side collision or the like. For example, Japanese Utility Model Application Publication (JP-Y) No. 5-410, Japanese Utility Model Application Laid-Open (JP-U) No. 3-13251, JP-U No. 3-49110 and JP-U No. 3-49111 disclose methods of absorbing the impact due to load at the time of a side collision by disposing an impact absorbing member formed from foamed urethane, foamed styrene or the like within a side door separately from the parts of the door.

JP-U No. 4-128912, Japanese Patent Application Laid-Open (JP-A) No. 6-72153, JP-U No. 6-78035, JP-A No. 6-247199, and JP-U No. 7-31432 disclose various impact absorbing members which absorb impacts by resin members which are formed by a plurality of ribs. Further, JP-U No. 7-13533 discloses an impact absorbing body having a hollow, box-shaped structural body which is mounted to the inner side of the door trim with an opening thereof oriented toward the door inner panel. The side wall portions of this structural body are inclined with respect to the direction in which the opening opens. JP-A No. 7-52735 discloses forming hollow bosses at the points of intersection of lattice-shaped ribs provided at the reverse surface of the door trim. In JP-A No. 7-228144, lattice-shaped resin ribs, in which slits for adjusting compression/buckling are formed at one side or both sides of the ribs, are provided at the reverse surface of a door trim base plate. JP-A No. 7-232556 discloses providing a gap between the inner panel and the distal ends of ribs which extend perpendicularly from the door trim, and form cut-out portions in the centers of the rib distal ends. In this way, impact absorption is carried out in two stages.

These impact absorbing members absorb impact energy due to the plastic deformation of ribs which receive a load due to the impact. By molding the impact absorbing members from resin, the ribs can be molded integrally with, for example, the door pocket provided at the side door, so that the number of processes for assembling the side door can be decreased.

Figure 6:
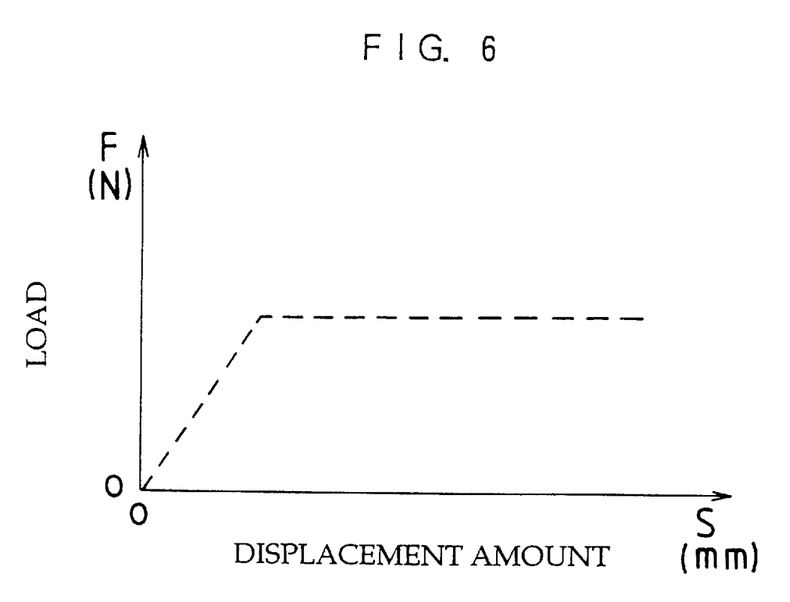
FIG. 6 is a graph illustrating a load-displacement amount curve which summarily illustrates ideal variations in the amount of displacement with respect to load at the time of impact absorption.

FIG. 6 illustrates an ideal load-displacement amount curve (withstand load characteristic) of an impact absorbing member at the time of impact energy absorption. In an impact absorbing member having an ideal withstand load characteristic, immediately after the impact absorbing member receives the impact load and begins to deform plastically, the load increases in accordance with the amount of displacement. However, when the load reaches a predetermined value and thereafter, variations in the load are suppressed, and only the amount of displacement changes. The energy absorption amount of the impact absorbing member is expressed by the area between the load-displacement amount curve and the horizontal axis. The closer the configuration of the region between the load-displacement amount curve and the horizontal axis is to a rectangle, the greater the area of this region. The ideal withstand load characteristic is substantially constant, without a sudden increase in the load, and has a low load value.

The withstand load characteristic needed for the impact absorbing member differs in accordance with the conditions of usage, the structure of the side door, the parts which are used, and the like. It is known that, when ribs are used as impact absorbing members, the withstand load characteristic varies greatly in accordance with the thickness of the ribs, the size of the ribs, and the intervals (spacings) at which the ribs are disposed. In particular, when the ribs are formed by injection molding or the like, drafts must be formed at the ribs in order to remove the molded product from the mold. Accordingly, the ribs are formed in taper shapes with the distal ends thereof being thin, and the proximal base portions thereof being thick. Although it is easy for the distal ends of such ribs to deform plastically, it is difficult for the proximal base portions thereof to deform plastically.

Therefore, when the impact absorbing member is being manufactured, in order to obtain a desired withstand load characteristic, the thickness of the ribs, the size of the ribs, the intervals (spacings) at which the ribs are disposed and the like are determined. A mold is made in accordance with the determined dimensions, and resin molding is carried out.

However, in a case in which the desired withstand load characteristic is not obtained, it is necessary to change the thickness of the ribs, the size of the ribs, the pitches, or the like. Because such changes affect the configuration of the mold to be used for molding, it is necessary to manufacture a new mold. Through such a process, manufacturing an impact absorbing member which results in a desired withstand load characteristic is extremely difficult. The costs involved in manufacturing the impact absorbing member increase, and a long period of time for production is required from the trial manufacturing stage until the mass production stage.

SUMMARY OF THE INVENTION

In view of the aforementioned, an object of the present invention is to provide an impact energy absorbing member by which a desired withstand load characteristic can easily be obtained.

A first aspect of the present invention is an impact energy absorbing member provided within a vehicle door, and due to impact load from an exterior, the impact energy absorbing member plastically deforms so as to absorb impact energy, comprising: a plurality of ribs whose respective surface directions are provided substantially along an impact load direction, respective ones of ends of the plurality of ribs in the surface directions of the plurality of ribs being fixed to predetermined positions within the vehicle door; and reduced cross-sectional area portions provided at fixed end sides of the plurality of ribs at which fixed end sides the ones of ends of the plurality of ribs are fixed, the reduced cross-sectional area portions being provided such that cross-sectional areas of the plurality of ribs along a direction orthogonal to the impact load direction become smaller toward the fixed end sides of the plurality of ribs from lengthwise intermediate portions of the plurality of ribs whose lengths run along the impact load direction.

In accordance with the first aspect, when an impact load is received, plastic deformation of the ribs begins from the side opposite to the fixed ends, and the impact energy is absorbed. The reduced cross-sectional area portions make the cross-sectional area receiving the load at the fixed end sides of the ribs smaller. As a result, when plastic deformation of the ribs receiving the impact load proceeds toward the fixed end sides of the ribs and reaches the reduced cross-sectional area portions, because the cross-sectional area receiving the load is reduced, the plastic deformation of the ribs proceeds without the deformation load becoming remarkably large. Impact energy can thereby be reliably absorbed at a low load.

The reduced cross-sectional area portions provided at the fixed end sides of the ribs can be formed by, for example, forming cut-out portions or the like in portions of the ribs. By changing the cross-sectional areas of the reduced cross-sectional area portions, the rate of plastic deformation of the ribs with respect to the impact load can be changed. As a result, by adjusting the cut-out amount at the time of forming the cut-out portions in the fixed end sides of the ribs, the rate of absorption of impact energy by the ribs can be adjusted, which is easier than changing the rib thickness or the intervals between ribs or the like in order to obtain a desired withstand load characteristic. The cut-out portions in this case may be formed, after the ribs are manufactured, by a method of cutting out sections of the ribs or the like. Or, during molding of the ribs, portions of the ribs other than the cut-out portions may be molded so as to substantially form the cut-out portions. These methods of forming the cut-out portions may be applied as well to the other aspects and embodiments of the present invention.

The fixed ends of the ribs are at the side at which one end of the ribs along the impact load direction is fixed and at which it is hard for plastic deformation (buckling) to occur immediately after the ribs have received the impact load. The other end portions of the ribs are free ends. When an impact load is received, the ribs may start to plastically deform from the free end sides thereof.

A second aspect of the present invention is an impact energy absorbing member in which, in the first aspect of the present invention, the plurality of ribs are formed in taper shapes such that thicknesses of the ones of ends of the plurality of ribs provided at the fixed end sides of the plurality of ribs are greater than thicknesses of the other ends of the plurality of ribs.

In accordance with the second aspect, by forming the ribs in taper shapes, the impact energy absorbing member can easily be removed from a mold when injection molding is carried out. Here, although the fixed end sides of the ribs are thick, by providing the reduced cross-sectional area portions by cutting out sections of these thick portions of the ribs or the like, the ribs can easily plastically deform even at the thick portions thereof.

With ribs formed in taper shapes in particular, plastic deformation proceeds from the free end sides, and the load gradually becomes large. However, by providing the reduced cross-sectional area portions at the fixed end sides, the deformation load of the ribs at the fixed end sides can be decreased, and the efficiency of absorbing the impact energy can be improved.

A third aspect of the present invention is an impact energy absorbing member provided within a vehicle door, and due to impact load from an exterior, the impact energy absorbing member plastically deforms so as to absorb impact energy, comprising: a plurality of ribs whose respective surface directions are directed in the same direction; a base plate portion with which the plurality of ribs are formed integrally such that respective one end of the plurality of ribs in the surface directions of the plurality of ribs is connected to the base plate portion, the base plate portion being mounted to a predetermined position of the vehicle door such that the respective surface directions of the plurality of ribs substantially run along an impact load direction; and reduced cross-sectional area portions provided at base plate portion sides of the plurality of ribs at which base plate portion sides the respective one end of the plurality of ribs is connected to the base plate portion, and the reduced cross-sectional area portions are provided such that cross-sectional areas of the plurality of ribs along a direction orthogonal to the impact load direction when the base plate portion is mounted to the vehicle door become smaller toward the base plate portion from lengthwise intermediate portions of the plurality of ribs whose lengths run along the impact load direction.

In accordance with the third aspect, because one end of the plurality of ribs along the impact load direction is connected by the base plate portion, the end portions of the ribs at the base plate portion side are fixed ends. The base plate portion can be used for connection at the time the ribs are molded integrally with a part within the vehicle door.

In ribs which receive impact loads, plastic deformation is generated from the free ends at the opposite side of the base plate portion. The reduced cross-sectional area portions plastically deform in accordance with the progression of the plastic deformation of the ribs. However, by adjusting the reduced cross-sectional areas at the reduced cross-sectional area portions, the withstand load characteristic can be adjusted.

A fourth aspect of the present invention is an impact energy absorbing member in which, in the third aspect of the present invention, the reduced cross-sectional area portions are formed by cut-out portions formed in the plurality of ribs, and the base plate portion has an opening which passes through the base plate portion and communicates with the cut-out portions formed in the plurality of ribs.

In accordance with the fourth aspect, the cut-out portions are provided at the base plate portion sides of the ribs, and an opening is formed in the base plate portion so as to correspond to the cut-out portions. If the cut-out portions are provided in the base plate portion sides of the ribs, it is difficult to remove the impact energy absorbing member from the mold at the time of molding. However, by providing the opening which passes through the base plate portion, the manufacturing of the mold for carrying out injection molding and the removal of the molded product from the mold are simplified, and the molding work becomes extremely easy.

As described above, in the above-described aspects, a desired withstand load characteristic is obtained by providing the reduced cross-sectional area portions at the fixed end sides of the ribs and varying the reduced cross-sectional area portions. Further, even if the ribs are formed in taper shapes, plastic deformation proceeds surely, and the impact energy can be absorbed efficiently.

In the above-described aspects, by forming the ribs and the base plate portion integrally, the mounting of the impact energy absorbing member to the interior of the vehicle door is facilitated, and impact energy can be absorbed efficiently by the reduced cross-sectional area portions.

In the above-described aspects, because the opening is provided in the base plate portion, excellent effects are achieved in that the injection molding operation is made extremely easy by providing the reduced cross-sectional area portions, the manufacturing cost can be kept down, and the period of time of work from the trial manufacturing stage to the mass production stage can be shortened.

DESCRIPTION OF THE PREFERRED EMBODIMENTS

Figure 1:
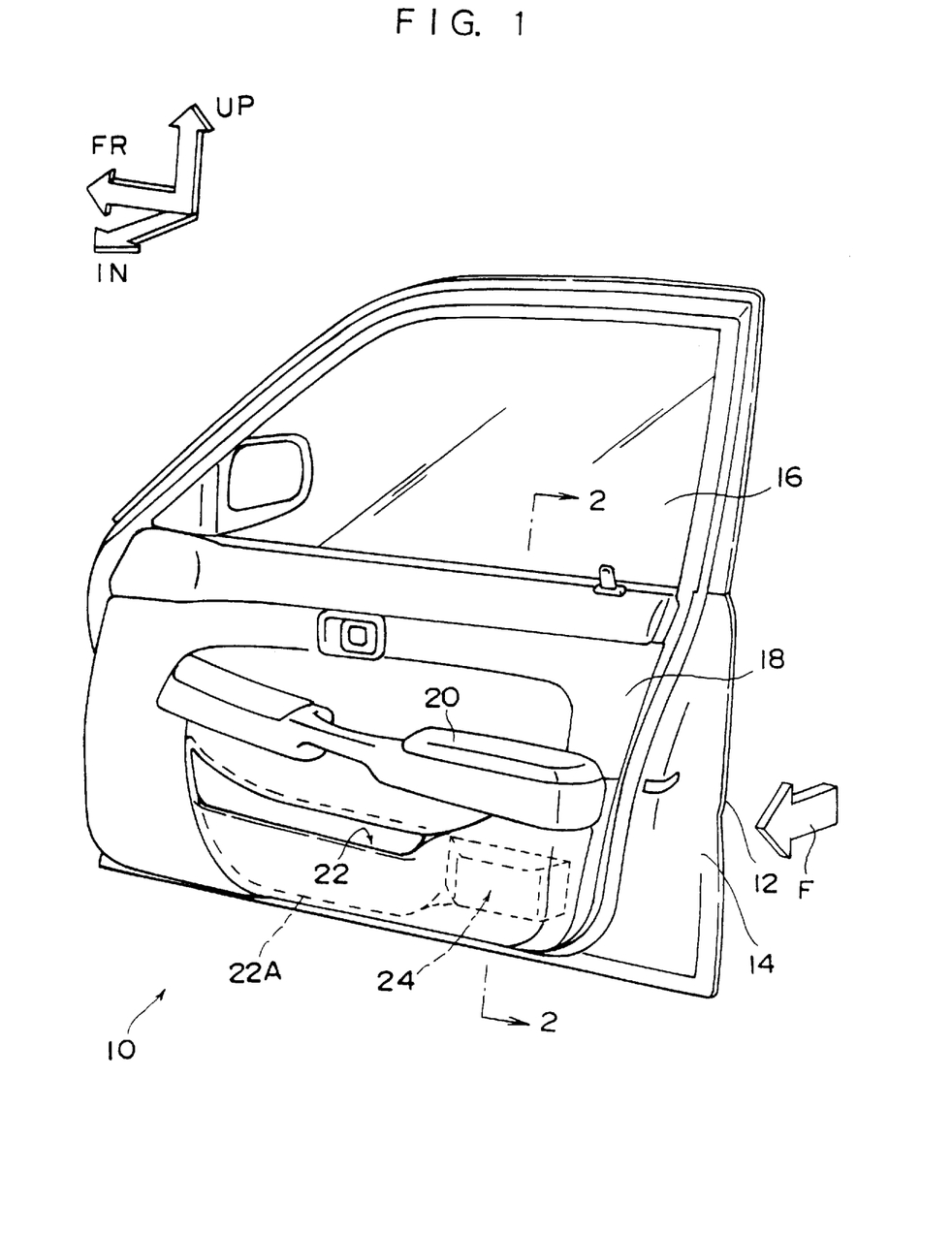
FIG. 1 is a schematic perspective view illustrating a side door of a vehicle to which the present invention is applied.
Figure 2:
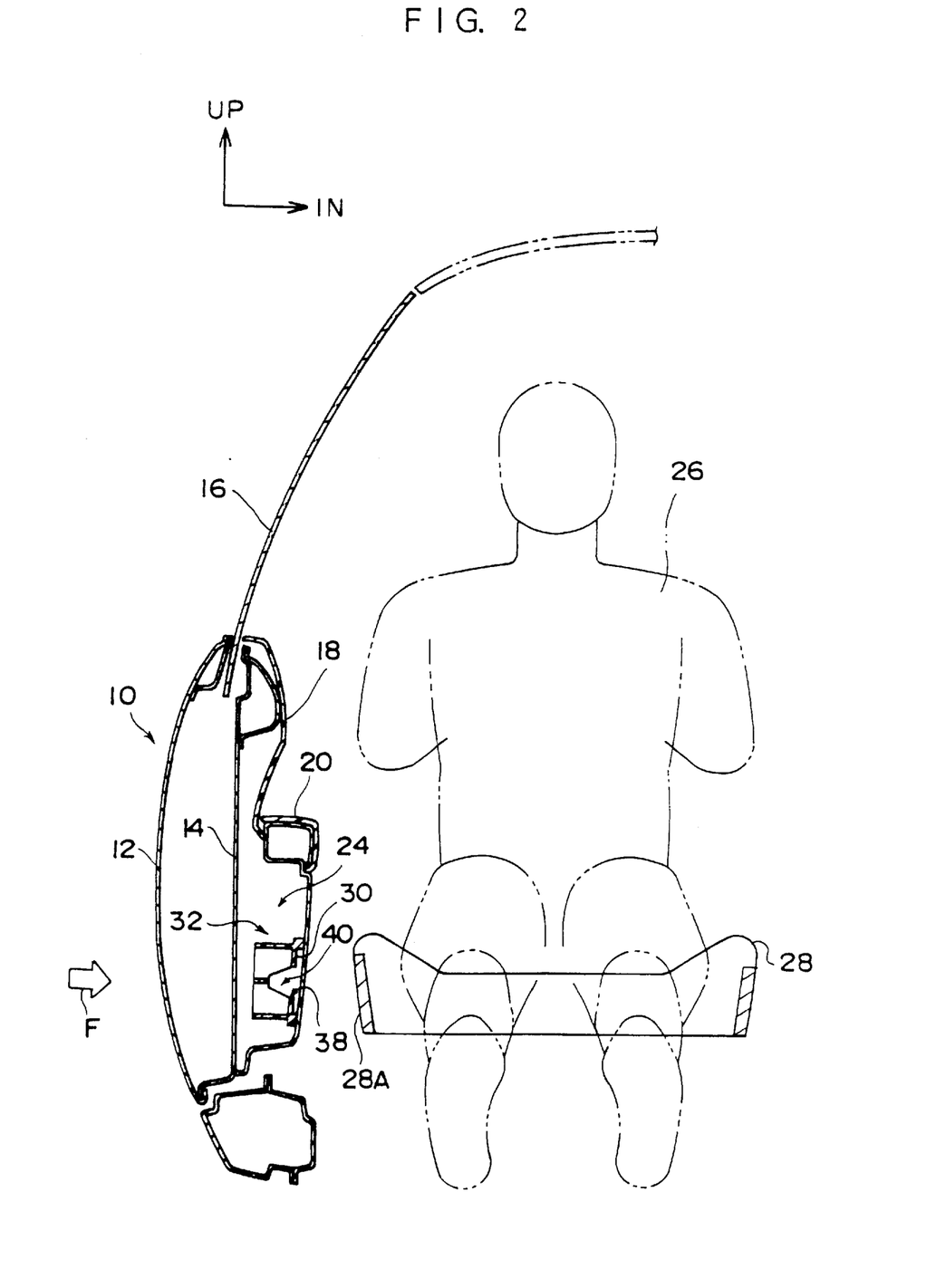
FIG. 2 is a schematic sectional view taken along a section 2—2 of FIG. 1.

A first embodiment of the present invention will be described hereinafter with reference to the drawings. FIGS. 1 and 2 illustrate a vehicle side door 10 to which the present embodiment is applied. FIGS. 1 and 2 illustrate, as an example, a side door 10 disposed on the right side of a vehicle. In the figures, the arrow UP indicates the upper side in the vertical direction of the vehicle, the arrow FR indicates the front side in the longitudinal direction of the vehicle, and the arrow IN indicates the inner side in the transverse direction of the vehicle. The arrow F represents the direction of force received due to a side collision or the like.

The side door 10 is an ordinary structure which includes a door outer panel 12, which is formed by a steel plate and provided at the vehicle transverse direction outer side, and a door inner panel 14, which is formed by a steel plate and provided at the vehicle transverse direction inner side. A door window glass 16 can be accommodated in the space between the door outer panel 12 and the door inner panel 14.

A door trim 18 formed from a synthetic resin is provided at the vehicle interior side surface of the door inner panel 14. An arm rest 20, which projects toward the vehicle interior, and a door pocket 22, which projects toward the vehicle interior and is open, are provided at the door trim 18. The door pocket 22 is a space formed by a door pocket forming member 22A which is formed from a synthetic resin and mounted to the door inner panel 14 side of the door trim 18.

An impact absorbing member 24 to which the present invention is applied is disposed at the door inner panel 14 side surface of the door trim 18. The impact absorbing member 24 may be resin-molded integrally with the door pocket forming member 22A which is mounted to the door trim 18. In this way, the number of operations involved in assembling the side door 10 can be decreased. In the present first embodiment, only the impact absorbing member 24 is described, and explanation of the connection of the impact absorbing member 24 and the door pocket forming member 22A is omitted.

As illustrated in FIG. 2, the region at which the impact absorbing member 24 is mounted to the door trim 18 opposes a seat frame 28A of a seat 28 on which a vehicle occupant 26 riding in the vehicle is seated. In this way, when an impact load from the vehicle transverse direction outer side is received and the door inner panel 14 moves toward the vehicle inner side, the impact absorbing member 24 is compressed between the door inner panel 14 and the door trim 18.

Figure 3:
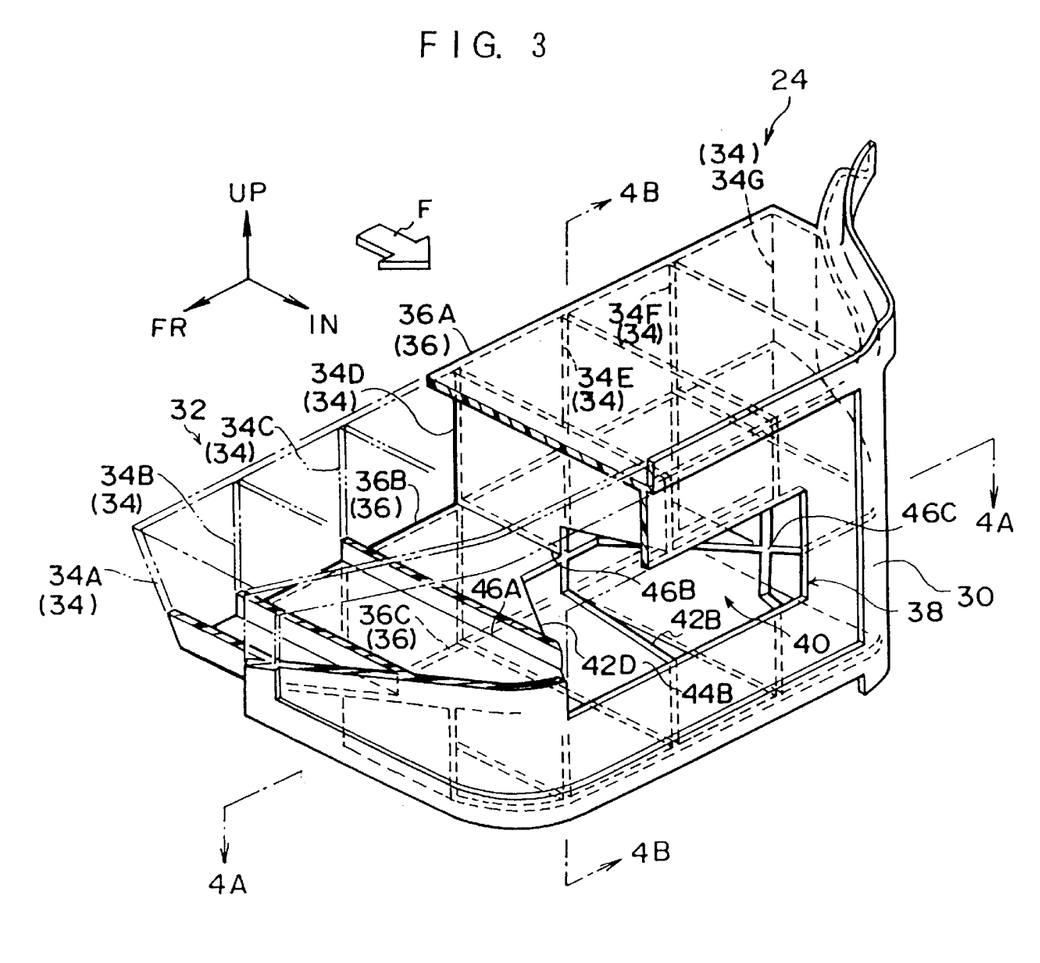
FIG. 3 is a schematic perspective view illustrating an impact absorbing member to which a first embodiment of the present invention is applied.
Figure 4A:
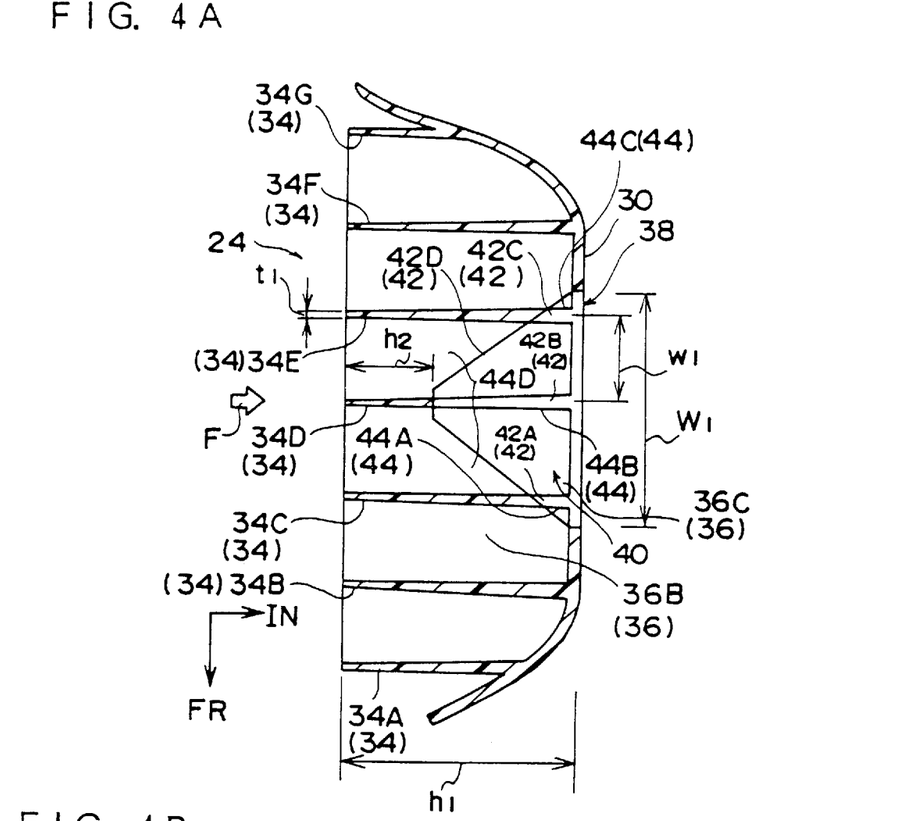
FIG. 4A is a schematic sectional view taken along line 4A—4A of FIG. 3.
Figure 4B:
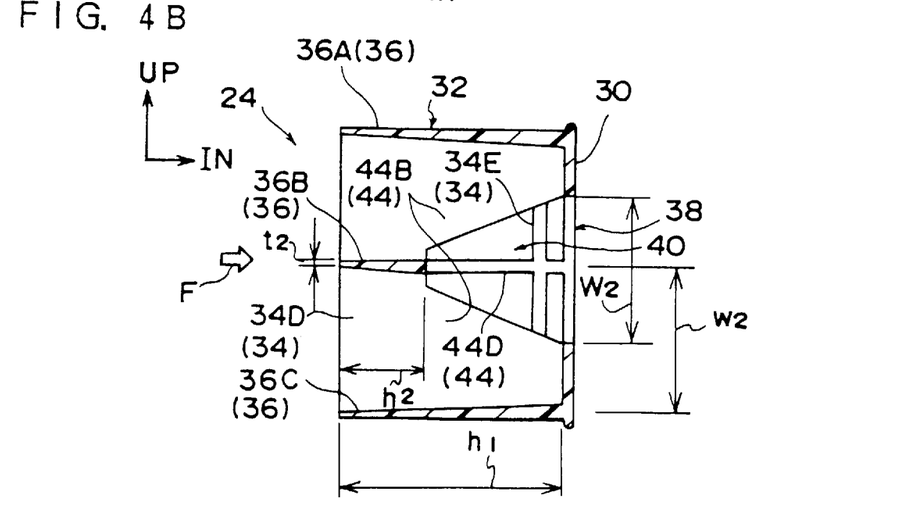
FIG. 4B is a schematic sectional view taken along line 4B—4B of FIG. 3.

FIGS. 3, 4A and 4B illustrate the schematic structure of the impact absorbing member 24. Any of various synthetic resin materials, such as polypropylene, can be used for the impact absorbing member 24. The impact absorbing member 24 of the present embodiment is injection molded by using the following product (commercial name) from Sumitomo Chemical Co., Ltd.: Sumitomo Nobulene WP712F (ethylene-propylene block copolymer, melt flow rate (MFR)=15).

As illustrated in FIG. 3, the impact absorbing member 24 has a base plate 30 which curves in accordance with the configuration of the door trim 18. An impact absorbing portion 32 is provided integrally with the base plate 30. The impact absorbing portion 32 is disposed from the base plate 30 toward the door inner panel 14. The base plate 30 is mounted to the door trim 18 by being fixed by any of various methods such as adhesion, welding, screws or the like. When the impact absorbing member 24 is molded integrally with the door pocket forming member 22A, the base plate 30 may be connected to the door pocket forming member 22A.

The impact absorbing portion 32 is structured such that, when the impact absorbing member 24 is mounted to the side door 10, a plurality of vertical ribs 34, whose surface direction (i.e., direction along which the surface extends) is along the vertical direction of the vehicle, and a plurality of horizontal ribs 36, whose surface direction is along the horizontal direction of the vehicle, are connected integrally in a lattice-like configuration so as to be disposed at predetermined pitches intervals $w_1$ (the spacing between the vertical ribs 34) and $w_2$ (the spacing between the horizontal ribs 36) (see FIGS. 4A, 4B). In the present embodiment, as an example, seven vertical ribs 34A through 34G ("vertical ribs 34" when referred to collectively) are disposed in a lattice-like configuration between three horizontal ribs 36A through 36C ("horizontal ribs 36" when referred to collectively), such that rectangular column shaped spaces are formed between the vertical ribs 34 and the horizontal ribs 36. By forming the horizontal ribs 36 longer than the vertical ribs 34, the external configuration of the impact absorbing member 24 is a rectangular block shape which is long in the longitudinal direction of the vehicle.

As illustrated in FIG. 2, a predetermined gap is formed between the door inner panel 14 and the impact absorbing portion 32 of the impact absorbing member 24. In this way, the vertical ribs 34 and the horizontal ribs 36 are disposed such that the ends thereof which are at the door inner panel 14 side are free ends, whereas the ends thereof at the connecting portions which connect the vertical ribs 34 and the horizontal ribs 36 to the base plate 30 are fixed ends. When the impact absorbing member 24 receives a load, the vertical ribs 34 and the horizontal ribs 36 plastically deform from the door inner panel 14 side (i.e., from the free end side).

As illustrated in FIGS. 4A and 4B, in order to easily remove the impact absorbing member 24 from a mold after molding, the vertical ribs 34 and the horizontal ribs 36 are respectively formed in a taper shape such that the thickness thereof at the connecting portion for connection with the base plate 30 is thicker than the thickness at the distal end thereof (thickness $t_1$ of the distal end of the vertical rib 34 or thickness $t_2$ of the distal end of the horizontal rib 36). In this way, for each of the vertical ribs 34 and the horizontal ribs 36, the cross-sectional area which receives the impact load (the cross-sectional area when cutting in a direction orthogonal to the vehicle transverse direction) gradually increases from the free end side toward the base plate 30 side.

As shown in FIG. 3, a cut-in portion 40 is provided in the impact absorbing portion 32 of the impact absorbing member 24. Further, an opening 38 is formed in the base plate 30 of the impact absorbing member 24.

The cut-in portion 40 is a space formed in the impact absorbing portion 32 by cut-out portions 42, each of which is formed by being cut out at the connecting portion of a vertical rib 34 and a horizontal rib 36 in a substantially trapezoidal shape. The opening 38 of the base plate 30 is formed so as to pass through the base plate 30 at the portion thereof corresponding to the respective cut-out portions 42. More specifically, each of the cut-out portions 42 is formed so as to straddle the opening 38 of the base plate 30.

As shown in FIGS. 4A and 4B, in the first embodiment, as one example, the opening 38 having a long-side direction opening width $W_1$ and a short-side direction opening width $W_2$ is formed in the substantially central portion of the base plate 30. The cut-out portion 42 is provided as cut-out portions 42A through 42D in the respective vertical ribs 34C through 34E and horizontal rib 36B which straddle the opening 38.

The depths of the cut-out portion 42D formed in the horizontal rib 36B straddling the opening portion 38 and the cut-out portion 42B formed in the vertical rib 34D straddling the opening portion 38 reach a position at a length $h_2$ from the distal end of the horizontal rib 36B, whereas the length of the horizontal rib 36B (as well as the vertical rib 34D) is $h_1$. Further, the depths of the cut-out portions 42A, 42C formed in the vertical ribs 34C, 34E, which are adjacent to the vertical rib 34D, reach positions corresponding to the cut-out portion 42D of the horizontal rib 36B.

In this way, reduced cross-sectional area portions 44A through 44D are formed in the vertical ribs 34C through 34E and in the horizontal rib 36B. The cross-sectional area of each of the reduced cross-sectional area portions 44A through 44D gradually decreases toward the connecting portion with the base plate 30 from the lengthwise (along the load direction) intermediate portion of the corresponding rib. The reduced cross-sectional area portions 44A through 44D are provided so that the total cross-sectional area of the vertical ribs 34 and the horizontal ribs 36 of the impact absorbing member 24 gradually decreases toward the base plate 30 from the lengthwise (i.e., load direction) intermediate portions of the ribs. Further, due to the cut-out portions 42A through 42D, the length, along the load direction, of connecting portions 46A through 46C, which are the portions at which the vertical ribs 34C through 34E are connected to the horizontal rib 36B respectively, are short. When the impact absorbing portion 32 receives an impact load, it is easy for the impact absorbing portion 32 to break at the connecting portions 46A through 46C.

Next, operation of the first embodiment will be described.

When the side door 10 receives an impact load toward the vehicle transverse direction inner side due to a side collision or the like, the side door outer panel 12 and the side door inner panel 14 are pushed inwardly in the vehicle transverse direction. The door inner panel 14, which is moved toward the interior of the vehicle due to the impact load, abuts the impact absorbing member 24 mounted to the door trim 18. Impact load is thereby applied to the impact absorbing member 24.

When impact load is applied to the impact absorbing member 24, first, the impact energy is absorbed due to the plastic deformation (e.g., buckling or the like) of the distal ends of the vertical ribs 34 and the horizontal ribs 36 which abut the door inner panel 14.

When the cross-sectional area which receives the load increases, it becomes difficult for plastic deformation to occur, and the load received by the base plate 30 is large. However, in the impact absorbing member 24, the reduced cross-sectional area portions 44A through 44D are provided at the base plate 30 side of the vertical ribs 34C through 34E and the horizontal rib 36B. Therefore, the load-receiving cross-sectional areas of the vertical ribs 34C through 34E and the horizontal rib 36B at the portions thereof from the lengthwise (along the load direction) intermediate portion toward the base plate 30 are reduced so that these portions plastically deform easily. The load received due to the impact energy can thereby be prevented from becoming high.

More specifically, at the impact absorbing member 24, plastic deformation proceeds easily to a vicinity of the base plate 30 in accordance with the magnitude of the load, so that the impact energy can reliably be absorbed. Accordingly, the load received by the base plate 30 of the impact absorbing member 24 does not become large.

In the above-described impact absorbing member 24, by varying the size of the cut-in portion 40, i.e., by varying the position at which the cross-sectional area of the impact absorbing portion 32 decreases and the amount of decrease in the cross-sectional area, the withstand load characteristic can easily be changed to a withstand load characteristic of a desired load energy absorbing amount.

Figure 5:
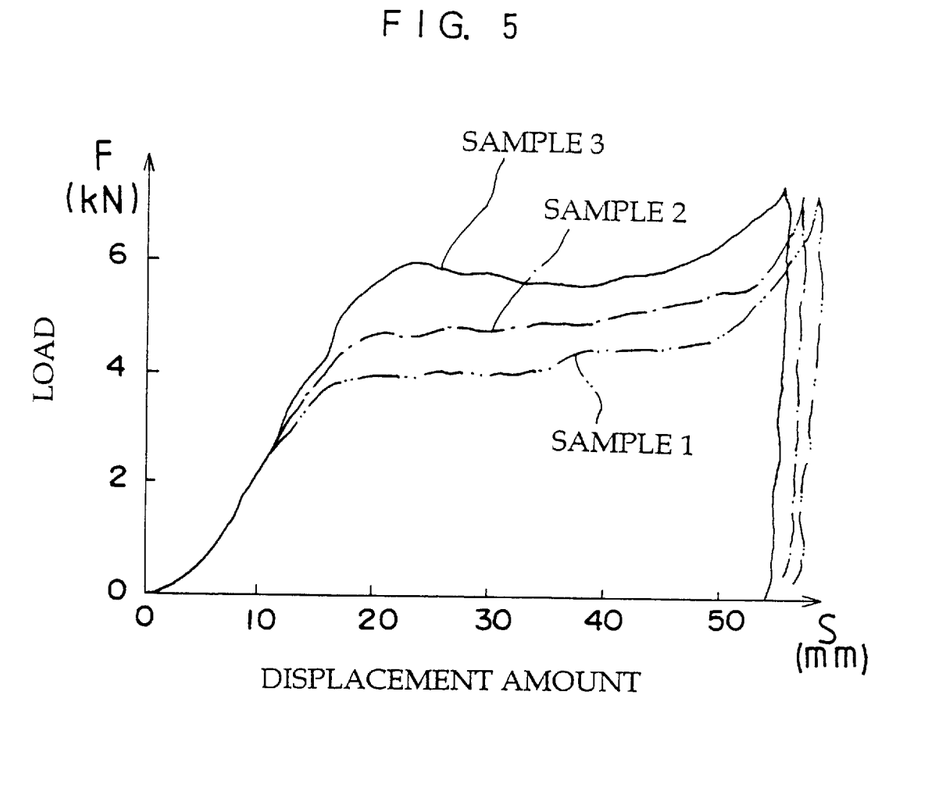
FIG. 5 is a graph illustrating load-displacement amount curves of impact absorption members to explain the first embodiment.

FIG. 5 illustrates load-displacement amount curves for sample 1 and sample 2, which are impact absorbing members 24 in which the cut-in portion 40 is provided, and sample 3, which is an impact absorbing member in which no cut-in portion 40 is formed.

In each of sample 1, 2 and 3, the interval spacing $w_1$ between the vertical ribs 34 is 35 mm, the interval spacing $w_2$ between the horizontal ribs 36 is 50 mm, the rib height $h_1$ is 70 mm, and the base plate 30 is provided with a gentle incline. Further, in the samples 1 through 3, the thickness $t_1$ of the distal ends of the vertical ribs 34 and the thickness $t_2$ of the distal ends of the horizontal ribs 36 are 0.8 mm. The samples 1 through 3 are injection molded to the same external configuration by using Sumitomo Noburene WP712F mentioned previously. Further, as mentioned previously, the opening 38 and the cut-in portion 40 are not formed in sample 3. By forming the vertical ribs 34 and the horizontal ribs 36 respectively in taper shapes in sample 3, the cross-sectional area gradually increases from the distal end of the impact absorbing member toward the base plate.

In sample 2, the opening widths $W_1$, $W_2$ of the opening 38 formed in the base plate 30 are $W_1$=70 mm and $W_2$=20 mm. The length $h_2$ from the distal end of the rib to the cut-in portion 40 is $h_2$=20 mm. The cut-out portions 42B, 42D are formed in the vertical rib 34D and the horizontal rib 36B.

In sample 1, the opening widths $W_1$, $W_2$ are $W_1$=120 mm and $W_2$=20 mm. The length $h_2$ from the distal end of the rib to the cut-in portion 40 is $h_2$=20 mm. The opening 38 is formed larger than that of sample 2. Therefore, in sample 1, the amount of the reduction of the cross-sectional area of the impact absorbing portion 32 is greater than that of sample 2.

Experimental measurements were conducted by colliding a 20.0 kgF collision body against each of samples 1 through 3 at a speed of 5.90 m/s. The amount of movement of the collision body from immediately after collision was measured as amount of displacement S (mm), and the load F (kN) received by the base plate 30 in accordance with the amount of movement S was measured.

As illustrated in FIG. 5, in the sample 3 in which neither the opening 38 nor the cut-in portion 40 were formed, the load F increased as the deformation progressed, such that a curve which was not near to the ideal curve illustrated in FIG. 6 was obtained.

In contrast, in sample 2, in the initial stages of collision of the collision body, the load F becomes high in accordance with the amount of displacement S. However, when the amount of displacement S increases to a certain extent, a region in which the load F is substantially constant regardless of the increase in the amount of displacement S arises. In this way, with the sample 2 in which the cut-in portion 40 is formed, the increase in the load F corresponding to the amount of displacement S is suppressed and the highest value of the load F is also held down, as compared with sample 3 in which no cut-in portion 40 is formed. It can therefore be understood that, as compared with sample 3, sample 2 is rather near to the ideal load-displacement amount curve (see FIG. 6).

With sample 1, in which the cut-in portion 40 is made larger than that of sample 2, immediately after the collision body collides, the load F increases in accordance with the amount of displacement S. However, the load F is substantially constant in a state in which the amount of displacement S is lower than in sample 2. The value of the load F at this time is also lower than in sample 2. Further, with sample 1, even if the amount of displacement S increases, the load F is controlled to a substantially constant value, and variations which are extremely near to the ideal load-displacement amount curve are exhibited. It can therefore be understood that, by varying the size of the cut-in portion 40, the load-displacement amount curve and the load F can be controlled.

For example, when the impact absorbing member 24 is being developed, in order to determine the dimensions (specifications) of the cut-in portion 40 which result in an optimum withstand load characteristic, first, impact absorbing members such as sample 3 in which an opening 38 and a cut-in portion 40 are not formed, or impact absorbing members 24 in which a small opening 38 and a small cut-in portion 40 are formed are provisionally molded. Next, the vertical ribs 34 and the horizontal ribs 36 are cut-in bit-by-bit so as to form the cut-in portion 40, and the opening 38 of the base plate 30 is made larger to match the cut-in portion 40. In this way, the size of the cut-in portion 40 and the size of the opening 38 are determined such that the load-displacement amount curve and the load values become desired values.

Thereafter, by using a mold which suits the determined opening 38 and cut-in portion 40, an impact absorbing member 24 having the desired withstand load characteristic can be manufactured.

A mold for injection molding an impact absorbing member 24 having a desired withstand load characteristic is formed by changing the mold used initially and provisionally to a cut-in portion 40 and an opening 38 which provide an optimum withstand load characteristic. However, because there is no need to change the thicknesses, the intervals $w_1$, $w_2$ and the like of the vertical ribs 34 and the horizontal ribs 36, there is no need to drastically remake the mold. Therefore, the period of time from the trial manufacturing stage of the impact absorbing member 24 to the mass production stage can be shortened, the work involved therein can be facilitated, and the manufacturing cost can be kept down.

In the impact absorbing member 24, because the opening 38 is formed in the base plate 30 in accordance with the cut-in portion 40 of the impact absorbing portion 32, the impact absorbing member 24 can very easily be removed from the mold even if the cut-out portions 42 are provided in the base plate 30 sides of the vertical ribs 34 and the horizontal ribs 36.

Next, a second embodiment of the present invention will be described.

Figure 7:
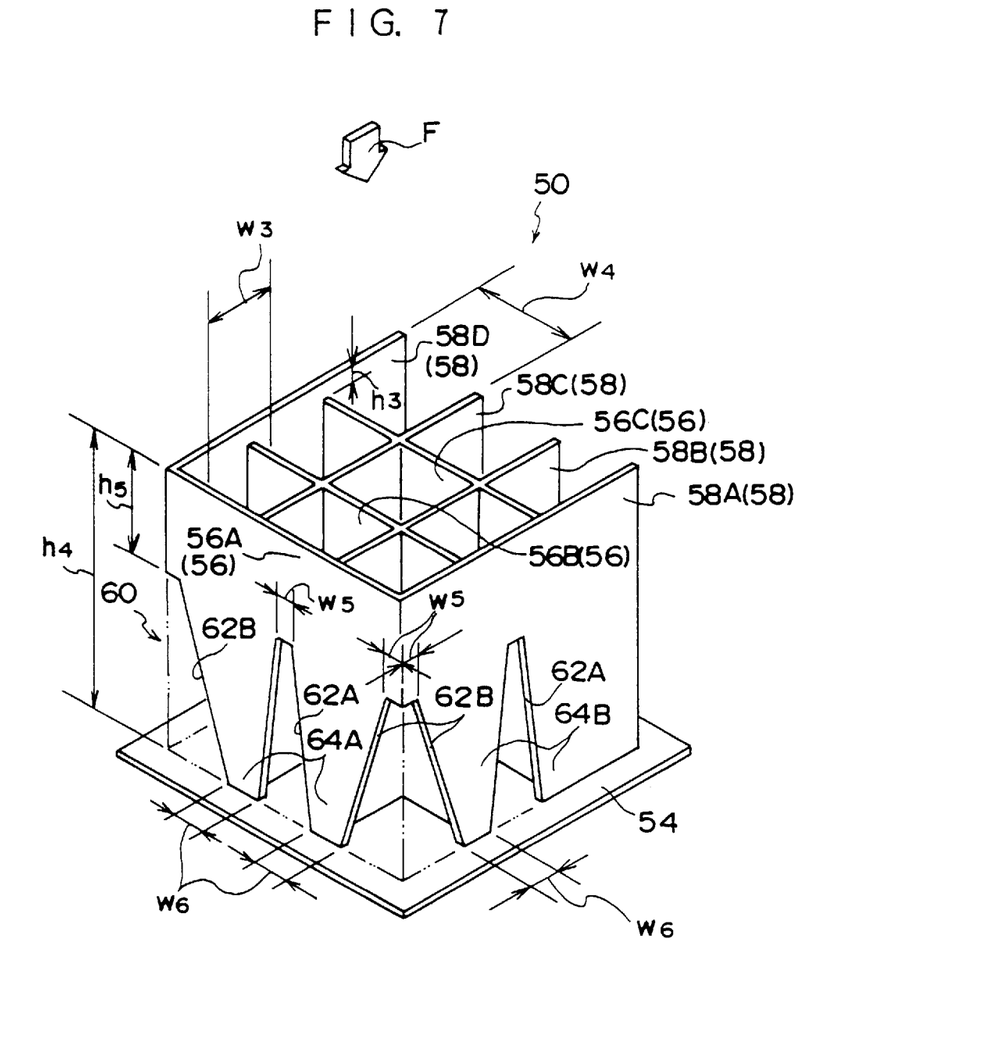
FIG. 7 is a perspective view illustrating a schematic structure of an impact absorbing member to which a second embodiment is applied.
Figure 8:
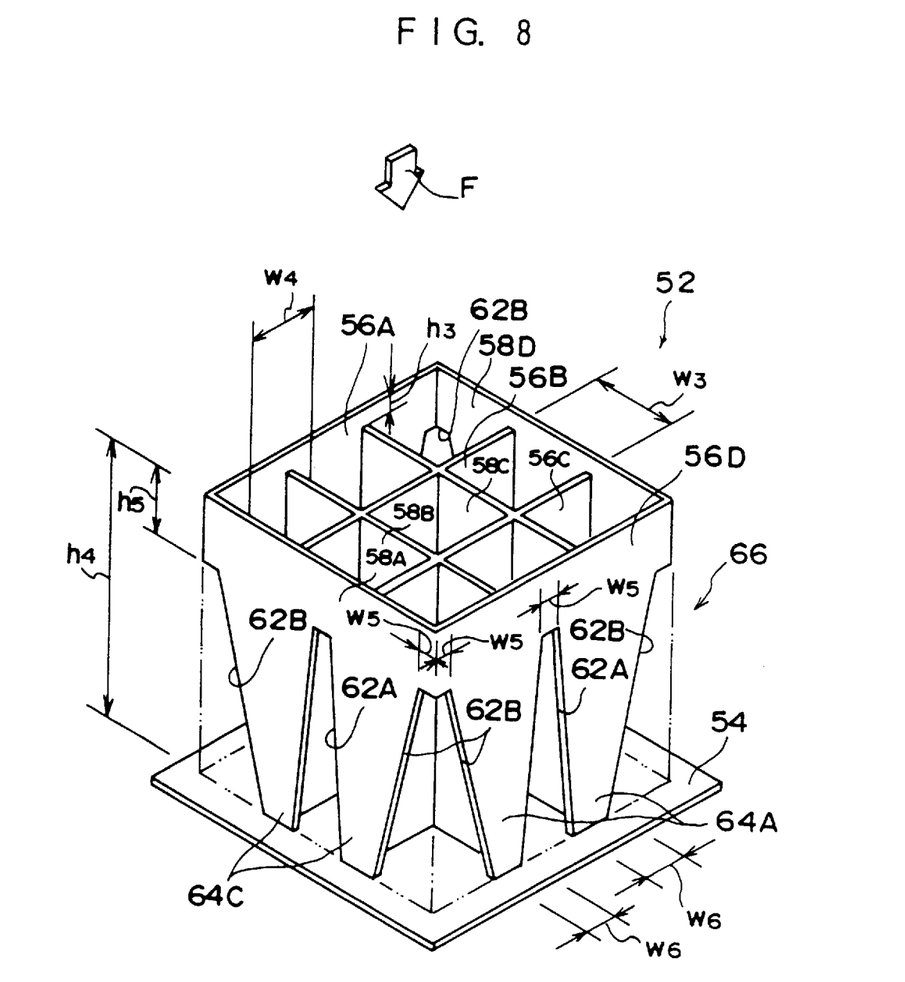
FIG. 8 is a perspective view illustrating a modified example of the impact absorbing member illustrated in FIG. 7.

FIG. 7 illustrates a schematic structure of an impact absorbing member 50 to which the second embodiment is applied, and FIG. 8 illustrates a schematic structure of an impact absorbing member 52 to which the second embodiment is applied. In the second embodiment, description of structures at times when the impact absorbing members 50, 52 are actually formed at side doors 10 of vehicles are omitted, and explanation is given of the impact absorbing members 50, 52 formed experimentally.

As illustrated in FIG. 7, the impact absorbing member 50 is provided with an impact absorbing portion 60 which is formed in a lattice shape by ribs 56A through 56C ("ribs 56") when referred to collectively), which are disposed parallel to one another at intervals of $W_3$ at a square, flat-plate shaped base plate 54, and ribs 58A through 58D ("ribs 58" when referred to collectively), which intersect the ribs 56A through 56C and are disposed parallel to one another at intervals of $W_4$. The impact absorbing portion 60 is enclosed on three sides by the rib 56A and the ribs 58A, 58D. The ribs 56A, 58A, 58D are provided so as to project higher, by a height $h_3$, than the ribs 56B, 56C, 58B, 58C which are enclosed by the ribs 56A, 58A, 58D. The ribs 56A, 58A, 58D are formed integrally with the base plate 54.

Cut-out portions 62A, 62B are formed in the base plate 54 sides of the ribs 56A, 58A, 58D enclosing the periphery of the impact absorbing portion 60. The cut-out portion 62A formed in the rib 56A is formed between, on the one hand, the joined portion of the rib 56A and the rib 58B, and on the other hand, the joined portion of the rib 56A and the rib 58C. A cut-out portion 62B is formed between, on the one hand, the joined portion of the rib 56A and the rib 58A, and on the other hand, the joined portion of the rib 56A and the rib 58B. Another cut-out portion 62B is formed between, on the one hand, the joined portion between the rib 56A and the rib 58D, and on the other hand, the joined portion of the rib 56A and the rib 58C. Reduced cross-sectional area portions 64A are formed in the rib 56A in a vicinity of the base plate 54 by the cut-out portions 62A, 62B.

Further, cut-out portions 62A are formed in the ribs 58A and 58D between the joined portions with the rib 56B and the joined portions with the rib 56C. The cut-out portions 62B are formed between, on the one hand, the joined portions of the rib 56A with the rib 58A and the rib 58D, and on the other hand, the joined portions of the rib 56B with the rib 58A and the rib 58D. Reduced cross-sectional area portions 64B are formed in the rib 58A and the rib 58D in a vicinity of the base plate 54 by the cut-out portions 62A, 62B. The cut-out portion 62A of the rib 58D is omitted from FIG. 7.

As illustrated in FIG. 8, the impact absorbing member 52 has an impact absorbing portion 66 in which a rib 56D is added to the impact absorbing portion 60 of the previously-described impact absorbing member 50. The periphery of the impact absorbing portion 66 is therefore surrounded by the ribs 56A, 56D, 58A, 58D. Note that FIG. 8 illustrates the impact absorbing member 52 as seen from a different direction than the impact absorbing member 50 illustrated in FIG. 7.

In the same way as the rib 56A, the cut-out portions 62A, 62B are formed in the rib 56D of the impact absorbing member 52. The reduced cross-sectional area portions 64A are formed in the rib 56D in a vicinity the base plate 54 by the cut-out portions 62A, 62B. Further, in the impact absorbing portion 66, by forming the cut-out portion 62B at the joined portion of the rib 58A and the rib 56D and at the joined portion of the rib 58D and the rib 56D, reduced cross-sectional area portions 64C are formed in the base plate 54 sides of the ribs 58A, 58D. (In the same way as in FIG. 7, the reduced cross-sectional area portions 64C of the rib 58D are omitted from FIG. 8.)

Figure 9A:
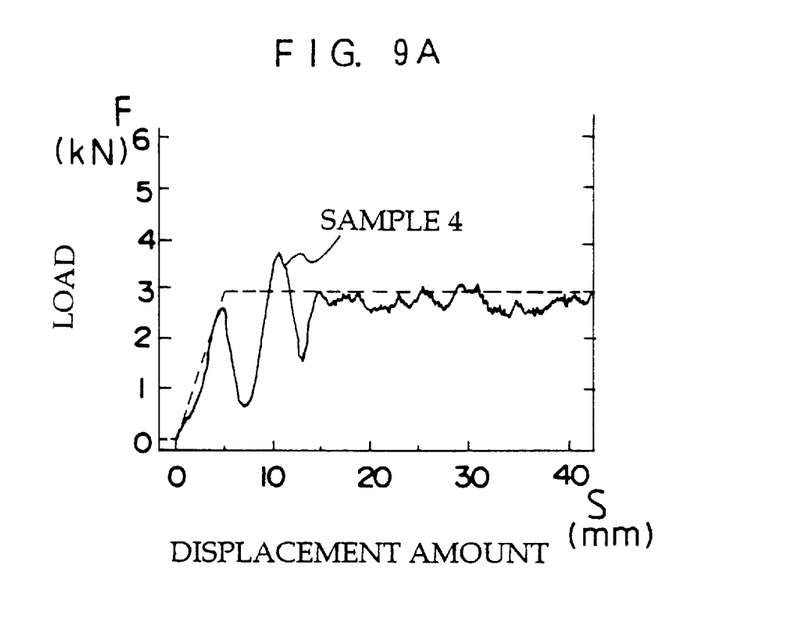
FIG. 9A is a graph showing a load-displacement amount curve illustrating experimental results of a sample using the structure of FIG. 7.
Figure 9B:
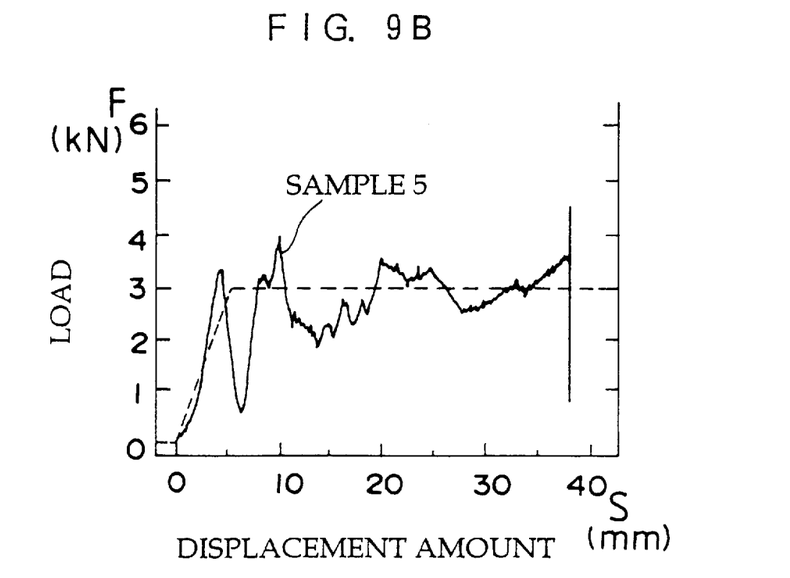
FIG. 9B is a graph showing a load-displacement amount curve illustrating experimental results of a sample using the structure of FIG. 8.

FIG. 9A illustrates a load-displacement amount curve obtained by experimentation by using the impact absorbing member 50 as sample 4. FIG. 9B illustrates a load-displacement amount curve using the impact absorbing member 52 as sample 5. In the impact absorbing portion 60 of the impact absorbing member 50 of sample 4 and the impact absorbing portion 66 of the impact absorbing member 52 of sample 5, the peripheries are 90 mm×90 mm and the heights $h_4$ are 80 mm, such that the external configuration dimensions are the same. In the samples 4 and 5, the intervals $W_3$, $W_4$ of the ribs 56, 58 respectively are 30 mm. The height difference $h_3$ between the peripheral ribs 56A, (56D), 58A, 58D and the central portion ribs 56B, 56C, 58B, 58C is 5 mm. Further, in the samples 4 and 5, the widthwise dimension $W_5$ of the upper edge of each of the cut-out portions 62A, 62B (i.e., the end portion at the side opposite the base plate 54) is 5 mm. The interval $w_6$, at the base plate 54 side, between adjacent cut-out portions 62A, 62B is 10 mm in samples 4 and 5.

In sample 4, the height $h_5$ from the distal ends of the ribs 56A, 58A, 58D to the cut-out portions 62A, 62B is 35 mm, and in sample 5, the height $h_5$ is 20 mm. Further, experimental measurement was carried out by colliding a collision body of 20 kgF at a speed of 4.5 m/s.

As illustrated in FIG. 9A and FIG. 9B, both sample 4 and sample 5 exhibit a substantially ideal load-displacement amount curve. (The lashed line in FIGS. 9A and 9B represents the ideal curve.) Samples 4 and 5 differ with respect to the existence of the rib 56D. However, by varying the sizes of the cut-out portions 62A, 62B, i.e., by varying the reduced cross-sectional area portions 64A through 64C, a load-displacement amount curve which is near to the ideal can be obtained for both sample 4 and sample 5. More specifically, the difference in the numbers of the ribs 56, 58 can be compensated for by adjusting the reduced cross-sectional area portions 64A through 64C.

It is clear that the reduced cross-sectional area portions 64A through 64C may be provided at the peripheral ribs 56A, 56D, 58A, 58D in order to control the withstand load characteristic.

The impact absorbing members 24, 50, 52 to which the first and second embodiments are applied are not intended to limit the structure of the impact energy absorbing member of the present invention. For example, although the same cut-out portions 62A, 62B are formed in the ribs 56A, 56D, 58A, 58B in the second embodiment, cut-out portions having respectively different sizes may be provided.

Further, the first and second embodiments described examples in which a plurality of ribs are arranged in a lattice configuration. However, the present invention is not limited to the same. The respective ribs may be formed along the load direction. For example, the ribs may be formed in any of various configurations such as a honeycomb shape, a pentagon shape, or the like.

In the first embodiment, the vertical ribs 34 and the horizontal ribs 36 are formed integrally with the base plate 30 of the impact absorbing member 24, and the opening 38 is provided in the base plate 30. In the second embodiment, the ribs 56, 58 are formed integrally with the base plate 54. However, the configurations and the existence of the base plates 30, 54, and the size and the configuration of the opening 38 formed in the base plate 30 are not limited to those described in the first and second embodiments. Other embodiments will be described hereinafter by using FIGS. 10A, 10B and 10C.

Figure 10A:
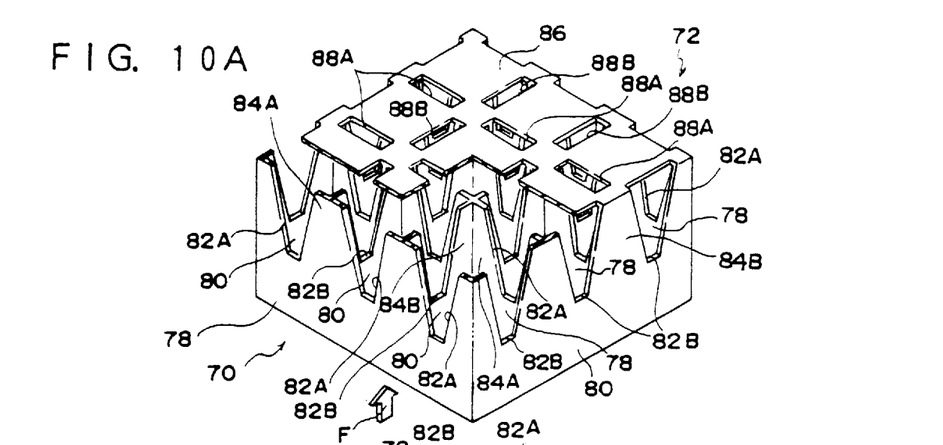
FIG. 10A is a schematic perspective view illustrating a modified example of an impact absorbing member to which the present invention is applied.
Figure 10B:
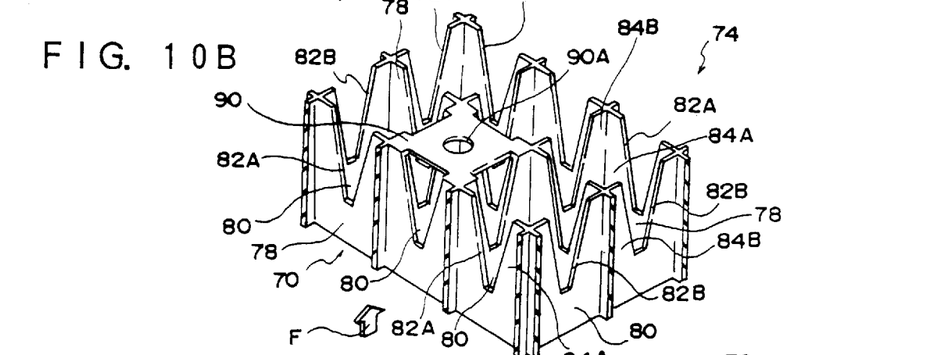
FIG. 10B is a schematic perspective view illustrating a modified example of an impact absorbing member to which the present invention is applied.
Figure 10C:
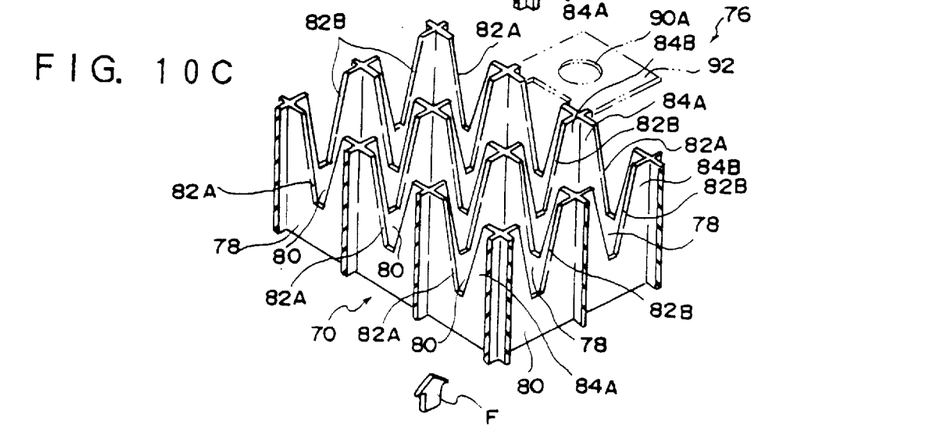
FIG. 10C is a schematic perspective view illustrating a modified example of an impact absorbing member to which the present invention is applied.

FIGS. 10A, 10B and 10C illustrate impact absorbing members 72, 74, 76, respectively, which are all provided with an impact absorbing portion 70 having the same structure. The impact absorbing portion 70 used in the impact absorbing members 72, 74, 76 has a lattice shape formed by a plurality of ribs 78, 80. Reduced cross-sectional area portions 84A are formed in the ribs 78 by cut-out portions 82A formed between the plurality of joined portions of the ribs 78 and the ribs 80. Further, reduced cross-sectional area portions 84B are formed in the ribs 80 by cut-out portions 82B formed between the plurality of joined portions of the ribs 80 and the ribs 78.

As illustrated in FIG. 10A, in the impact absorbing member 72, the impact absorbing portion 70 and a base plate 86 are formed integrally. Openings 88A, 88B are formed in the base plate 86 at positions opposing the cut-out portions 82A, 82B provided in the ribs 78, 80.

It suffices that the openings formed in the base plate in the present embodiment pass through the base plate and expose the cut-out portions formed in the ribs. In this way, the structure of the mold used for injection molding is simplified, and removal of the impact absorbing member from the mold after injection molding is facilitated.

In FIG. 10B, in the impact absorbing member 74, a small base plate 90 is formed integrally with a plurality of the ribs 78, 80 so as to span between the plurality of the ribs 78, 80 at the impact absorbing portion 70. The impact absorbing member 74 can be fixed to a predetermined position of the door trim 18 by using this small base plate 90. Further, as illustrated in FIG. 10C, the impact absorbing member 76 is formed only by the impact absorbing portion 70.

In the impact absorbing members 74, 76 (and particularly the impact absorbing member 76), the cut-out portion 82A, 82B side of the impact absorbing portion 70 (i.e., the distal end portion side of the reduced cross-sectional area portions 84A, 84B) can be made to abut and mounted to a predetermined region of the door trim 18 or the like so as to become the fixed ends. In this way, the plastic deformation of the ribs 78, 80 begins from the opposite side of the fixed ends (the opposite side of the cut-out portions 82A, 82B) when an impact load is received.

A through hole 90A may be provided in the small base plate 90 of the impact absorbing member 74, so that the impact absorbing member 74 may be fixed to the door trim 18 by a clip or a screw or the like inserted in the through hole 90A. Further, a flange 92 or the like for mounting to the door trim or the like may be formed at the impact absorbing member 76. The through hole 90A may be formed in the flange 92.

In the present invention, the existence of a base plate formed integrally with the ribs and the size of a base plate can be set arbitrarily, and the desired withstand load characteristic can be obtained by the cut-out portions formed in the ribs.

In the description of the above embodiments, the impact energy absorbing members of the present invention are formed integrally with the door pocket forming member 22A and mounted to the door trim 18. However, the present invention is not limited to the same, and, for example, the impact energy absorbing members may be mounted to the door inner panel 14 or the like. In this case, a cut-out portion may be formed in the door inner panel 14, and plastic deformation may start from the free end side of the door trim 18 side when an impact load is received. More specifically, one end in the impact load direction may be the fixed end, and plastic deformation may start from the free end opposite to this fixed end. In this way, the reduced cross-sectional area portions can control the withstand load characteristic.

Further, in the above-described embodiments, the cut-out portions are provided in the thick sides of the ribs which are formed in taper shapes. However, the configuration of the ribs is not limited to this shape, and, for example, the ribs may be straight so as to have a uniform thickness along the load direction.

What is claimed is:

1. An impact energy absorbing member provided within a vehicle door, and due to an impact load from an exterior of said vehicle door, said impact energy absorbing member plastically deforms so as to absorb impact energy, comprising:

a plurality of ribs whose respective surface directions are provided substantially along an impact load direction, respective ends of said plurality of ribs being fixed to predetermined positions within the vehicle door; and reduced cross-sectional area portions provided at said ends of said plurality of ribs fixed to said predetermined positions, said reduced cross-sectional area portions being formed by cut-out portions in said fixed ends, wherein said reduced cross-sectional area portions are configured such that cross-sectional areas of said plurality of ribs along a direction orthogonal to the impact load direction become smaller toward the fixed ends of said plurality of ribs from lengthwise intermediate portions of said plurality of ribs, lengths of said lengthwise intermediate portions running along the impact load direction.

2. An impact energy absorbing member according to claim 1, wherein said plurality of ribs are formed in tapered shapes such that thicknesses of the fixed ends of said plurality of ribs are greater than thicknesses of opposite ends of said plurality of ribs.

3. An impact energy absorbing member according to claim 1, wherein said cut-out portions are formed such that dimensions of said cut-out portions in a direction orthogonal to the impact load direction increase from the lengthwise intermediate portions of said plurality of ribs toward the fixed ends of said plurality of ribs.

4. An impact energy absorbing member according to claim 1, further comprising:

a base plate portion with which said plurality of ribs are formed integrally at the fixed ends of said plurality of ribs.

5. An impact energy absorbing member according to claim 4, wherein said base plate portion has an opening which passes through said base plate portion and communicates with said cut-out portions formed in said plurality of ribs.

6. An impact energy absorbing member according to any of claims 1 and 3, wherein a plurality of the ribs extending along the vertical direction of the vehicle and a plurality of the ribs extending along the horizontal direction of the vehicle are connected integrally in a lattice-shaped configuration, and each of the cut-out portions is formed by cutting out a connecting portion of one vertical rib and one horizontal rib in a substantially trapezoidal shape.

7. An impact energy absorbing member provided within a vehicle door, and due to an impact load from an exterior of said vehicle door, said impact energy absorbing member plastically deforms so as to absorb impact energy, comprising:

a plurality of ribs whose respective surface directions are directed in the same direction;

a base plate portion with which said plurality of ribs are formed integrally such that respective ends of said plurality of ribs in the surface directions of said plurality of ribs are connected to said base plate portion, said base plate portion being mounted to a predetermined position of the vehicle door such that the respective surface directions of said plurality of ribs run substantially along an impact load direction; and reduced cross-sectional area portions provided at said ends of said plurality of ribs which are connected to said base plate portion, said reduced cross-sectional area portions being formed by cut-out portions in said ends connected to said base plate portions, wherein said reduced cross-sectional area portions are configured such that cross-sectional areas of said plurality of ribs along a direction orthogonal to the impact load direction when said base plate portion is mounted to the vehicle door become smaller toward said base plate portion from lengthwise intermediate portions of said plurality of ribs, lengths of said lengthwise intermediate portions run along the impact load direction.

8. An impact energy absorbing member according to claim 7, wherein said base plate portion has an opening which passes through said base plate portion and communicates with the cut-out portions formed in said plurality of ribs.

9. An impact energy absorbing member according to claim 7, wherein said cut-out portions are formed such that dimensions of said cut-out portions in a direction orthogonal to the impact load direction increase from the lengthwise intermediate portions of said plurality of ribs toward said ends of said plurality of ribs.

10. An impact energy absorbing member according to claim 8, wherein the base plate portion having said opening is fixed to an outer side of a door trim in a vehicle width direction.

* * * * *